(12) United States Patent
Takeuchi et al.

(10) Patent No.: US 11,387,454 B2
(45) Date of Patent: *Jul. 12, 2022

(54) SECONDARY BATTERY

(71) Applicant: NGK INSULATORS, LTD., Nagoya (JP)

(72) Inventors: Yukihisa Takeuchi, Nagoya (JP); Iwao Ohwada, Nagoya (JP); Yukinobu Yura, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 152 days.

This patent is subject to a terminal disclaimer.

(21) Appl. No.: 16/391,689

(22) Filed: Apr. 23, 2019

(65) Prior Publication Data

US 2019/0252682 A1 Aug. 15, 2019

Related U.S. Application Data

(63) Continuation of application No. PCT/JP2017/040588, filed on Nov. 10, 2017.

(30) Foreign Application Priority Data

Nov. 11, 2016 (JP) .............................. JP2016-220914
Jan. 31, 2017 (JP) .............................. JP2017-015943
Aug. 1, 2017 (WO) ................... PCT/JP2017/027863

(51) Int. Cl.
*H01M 4/525* (2010.01)
*H01M 10/0525* (2010.01)
(Continued)

(52) U.S. Cl.
CPC ........... *H01M 4/525* (2013.01); *H01M 4/131* (2013.01); *H01M 4/40* (2013.01); *H01M 4/485* (2013.01);
(Continued)

(58) Field of Classification Search
CPC ...... H01M 4/131; H01M 4/505; H01M 4/525; H01M 4/86–98
See application file for complete search history.

(56) References Cited

U.S. PATENT DOCUMENTS 6,558,847 B1 * 5/2003 Kawakami ............ H01M 4/131
423/618
2001/0033963 A1 10/2001 Yamazaki et al.
(Continued)

FOREIGN PATENT DOCUMENTS

EP 1 760 819 A2 3/2007
JP H03-071566 A1 3/1991
(Continued)

OTHER PUBLICATIONS

JP-2012099225-A English machine translation (Year: 2020).*
(Continued)

*Primary Examiner* — Ula C Ruddock
*Assistant Examiner* — Armindo Carvalho, Jr.
(74) *Attorney, Agent, or Firm* — Burr & Brown, PLLC

(57) ABSTRACT

The present invention provides a secondary battery, including a positive electrode plate composed of an inorganic material including a positive electrode active material in an oxide form and having a thickness of 25 μm or more; a negative electrode plate composed of an inorganic material including a negative electrode active material in an oxide form and having a thickness of 25 μm or more; and an inorganic solid electrolyte layer, wherein the secondary battery is chargeable and dischargeable at a temperature of 100° C. or more. The present invention can provide rapid charge/discharge at a high cycle capacity retention and increase the capacity of the secondary battery.

14 Claims, 4 Drawing Sheets

(51) Int. Cl.

| | | |
|---|---|---|
| *H01M 4/485* | (2010.01) | |
| *H01M 10/0585* | (2010.01) | |
| *H01M 10/052* | (2010.01) | |
| *H01M 4/505* | (2010.01) | |
| *H01M 4/40* | (2006.01) | |
| *H01M 10/0562* | (2010.01) | |
| *H02J 1/00* | (2006.01) | |
| *H01M 10/617* | (2014.01) | |
| *H02J 7/04* | (2006.01) | |
| *H01M 10/667* | (2014.01) | |
| *H02J 7/34* | (2006.01) | |
| *H01M 10/658* | (2014.01) | |
| *H01M 10/44* | (2006.01) | |
| *H01M 50/20* | (2021.01) | |
| *H01M 10/615* | (2014.01) | |
| *H01M 10/6571* | (2014.01) | |
| *H01M 4/131* | (2010.01) | |
| *H01M 10/058* | (2010.01) | |
| *H01M 10/42* | (2006.01) | |
| *H02J 7/00* | (2006.01) | |
| *H01M 4/02* | (2006.01) | |

(52) U.S. Cl.
CPC ......... *H01M 4/505* (2013.01); *H01M 10/052* (2013.01); *H01M 10/058* (2013.01); *H01M 10/0525* (2013.01); *H01M 10/0562* (2013.01); *H01M 10/0585* (2013.01); *H01M 10/425* (2013.01); *H01M 10/44* (2013.01); *H01M 10/615* (2015.04); *H01M 10/617* (2015.04); *H01M 10/658* (2015.04); *H01M 10/6571* (2015.04); *H01M 10/667* (2015.04); *H01M 50/20* (2021.01); *H02J 1/00* (2013.01); *H02J 7/007* (2013.01); *H02J 7/04* (2013.01); *H02J 7/34* (2013.01); *H01M 4/02* (2013.01); *H01M 2004/021* (2013.01); *H01M 2010/4271* (2013.01); *H01M 2220/30* (2013.01); *H01M 2300/0065* (2013.01)

(56) References Cited

U.S. PATENT DOCUMENTS

| | | | | |
|---|---|---|---|---|
| 2002/0074972 | A1* | 6/2002 | Narang | H01M 4/36 320/131 |
| 2004/0009756 | A1 | 1/2004 | Kuranuki et al. | |
| 2006/0275664 | A1* | 12/2006 | Ohzuku | C01G 49/009 429/220 |
| 2008/0138701 | A1 | 6/2008 | Kuboki et al. | |
| 2010/0112443 | A1* | 5/2010 | Blomgren | H01M 4/5825 429/221 |
| 2010/0159332 | A1 | 6/2010 | Sugiura et al. | |
| 2012/0258365 | A1* | 10/2012 | Yokoyama | C01G 51/42 429/223 |
| 2014/0079993 | A1* | 3/2014 | Lee | H01M 4/1393 429/211 |
| 2016/0071552 | A1 | 3/2016 | Ohwada et al. | |
| 2016/0268639 | A1 | 9/2016 | Mizuno et al. | |
| 2017/0373300 | A1 | 12/2017 | Maeda et al. | |
| 2018/0233744 | A1 | 8/2018 | Ohira et al. | |

FOREIGN PATENT DOCUMENTS

| | | | |
|---|---|---|---|
| JP | H04-010366 | A1 | 1/1992 |
| JP | 2001-308537 | A1 | 11/2001 |
| JP | 2002-008604 | A1 | 1/2002 |
| JP | 2003-197164 | A1 | 7/2003 |
| JP | 2004-096714 | A1 | 3/2004 |
| JP | 2005-260699 | A1 | 9/2005 |
| JP | 2005-286011 | A1 | 10/2005 |
| JP | 2006-196397 | A1 | 7/2006 |
| JP | 2008-147391 | A1 | 6/2008 |
| JP | 2009-516359 | A1 | 4/2009 |
| JP | 2010-212062 | A1 | 9/2010 |
| JP | 2012-099225 | A1 | 5/2012 |
| JP | 2012099225 | A * | 5/2012 |
| JP | 2013-105708 | A1 | 5/2013 |
| JP | 5730538 | B2 | 6/2015 |
| JP | 2015-185337 | A1 | 10/2015 |
| JP | 2016-066550 | A1 | 4/2016 |
| JP | 5952161 | B2 | 7/2016 |
| WO | 2006/019064 | A2 | 2/2006 |
| WO | 2007/061928 | A2 | 5/2007 |
| WO | 2010/074304 | A1 | 7/2010 |
| WO | 2015/170545 | A1 | 11/2015 |
| WO | 2016/152565 | A1 | 9/2016 |
| WO | 2017/146088 | A1 | 8/2017 |

OTHER PUBLICATIONS

Extended European Search Report (Application No. 17869986.4) dated Jun. 4, 2020.
Korean Office Action (Application No. 10-2019-7013226) dated Jul. 2, 2020 (with English translation).
International Search Report and Written Opinion (Application No. PCT/JP2017/040588) dated Feb. 13, 2018 (with English translation).
International Search Report and Written Opinion (Application No. PCT/JP2017/027863) dated Nov. 7, 2017 (with English translation).

* cited by examiner

SECONDARY BATTERY

CROSS-REFERENCE TO RELATED APPLICATIONS

This application is a continuation application of PCT/JP2017/040588 filed Nov. 10, 2017, which claims priority to Japanese Patent Application No. 2016-220914 filed Nov. 11, 2016, Japanese Patent Application No. 2017-015943 filed Jan. 31, 2017, and PCT/JP2017/027863 filed Aug. 1, 2017, the entire contents all of which are incorporated herein by reference.

BACKGROUND OF THE INVENTION

1. Field of the Invention

The present invention relates to secondary batteries.

2. Description of the Related Art

Recent development of portable devices, such as personal computers and mobile phones, has led to an increasing demand for batteries as the power sources for these devices. In the batteries used in such applications, liquid electrolytes (electrolyte solutions) each comprising a combustible organic solvent as a diluent solvent are used as media for migrating ions. The batteries including such electrolyte solutions may cause the leakage, ignition, or explosion of the electrolyte solutions. To solve such problems and ensure the essential safety, the development of all-solid-state secondary batteries has been advanced, in which the liquid electrolytes are replaced with solid electrolytes and all the other components are composed of solid materials. The solid electrolytes reduce risks of ignition, leakage, and degradation of battery performance caused by corrosion of the all-solid-state secondary batteries.

For example, Patent Document 1 (JP2016-66550A) discloses an all-solid-state secondary battery having stable charge/discharge characteristics under high temperatures, the secondary battery comprising a solid electrolyte layer including a first sublayer having a NASICON structure comprising Li, Al, Ti, and P, and a second sublayer having a NASICON structure comprising Li, Al, M (where M is Ge or Zr), and P without Ti. This literature describes the production of an all-solid-state secondary battery comprising a positive electrode layer having a thickness of 9 µm, a negative electrode layer having a thickness of 12 µm, and the solid electrolyte layer having a thickness of 12 µm.

Patent Document 2 (JP2015-185337A) discloses an all-solid-state battery comprising a positive electrode, a negative electrode, and a solid electrolyte layer, wherein the positive electrode or the negative electrode comprises a sintered body of lithium titanate ($Li_4Ti_5O_{12}$).

Patent Document 3 (WO2017/146088) discloses use of an oriented positive electrode plate for a lithium secondary battery comprising a solid electrolyte, wherein the oriented positive electrode plate comprises primary particles composed of a lithium composite oxide such as lithium cobaltite ($LiCoO_2$), and the primary particles are oriented at an average orientation angle of more than 0° and 30° or less to the plane of the positive electrode plate.

CITATION LIST

Patent Documents

Patent Document 1: JP2016-66550A
Patent Document 2: JP2015-185337A
Patent Document 3: WO2017/146088

SUMMARY OF THE INVENTION

Unfortunately, the all-solid-state secondary battery disclosed in Patent Document 1 has low capacity or low energy density. The all-solid-state secondary battery disclosed in Patent Document 2 significantly degrades during the operation of the battery under a high temperature condition.

The present inventors have discovered that a secondary battery comprising a positive electrode plate and a negative electrode plate each made of an inorganic material comprising an oxide and an inorganic solid electrolyte layer can have a large capacity and can provide rapid charge/discharge at a high cycle capacity retention through control of the thickness of the positive electrode plate and that of the negative electrode plate to be 25 µm or more and charging/discharging at a temperature of 100° C. or more.

Accordingly, an object of the present invention is to provide a secondary battery that provides rapid charge/discharge at a high cycle capacity retention while having an increased capacity.

One aspect according to the present invention provides a secondary battery comprising
  a positive electrode plate composed of an inorganic material comprising a positive electrode active material in an oxide form and having a thickness of 25 µm or more,
  a negative electrode plate composed of an inorganic material comprising a negative electrode active material in an oxide form and having a thickness of 25 µm or more, and
  an inorganic solid electrolyte layer,
  wherein the secondary battery is charged and discharged at a temperature of 100° C. or more.

Another aspect according to the present invention provides a method of operating a secondary battery, comprising:
  providing a secondary battery comprising a positive electrode plate composed of an inorganic material comprising a positive electrode active material in an oxide form and having a thickness of 25 µm or more, a negative electrode plate composed of an inorganic material comprising a negative electrode active material in an oxide form and having a thickness of 25 µm or more, and an inorganic solid electrolyte layer; and
  heating the secondary battery to a temperature of 100° C. or more to perform charge/discharge.

DESCRIPTION OF EMBODIMENT

Secondary Battery

The present invention relates to secondary batteries. Herein, the term "secondary battery", in a broad sense, refers to any repeatedly chargeable/dischargeable battery including a positive electrode plate, a negative electrode plate, and a solid electrolyte layer composed of inorganic materials described later. Examples of such a secondary battery include lithium secondary batteries (also referred to as lithium ion secondary batteries), sodium ion batteries, magnesium ion secondary batteries, and aluminum ion secondary batteries. Preferred are lithium secondary batteries.

Figure 1:
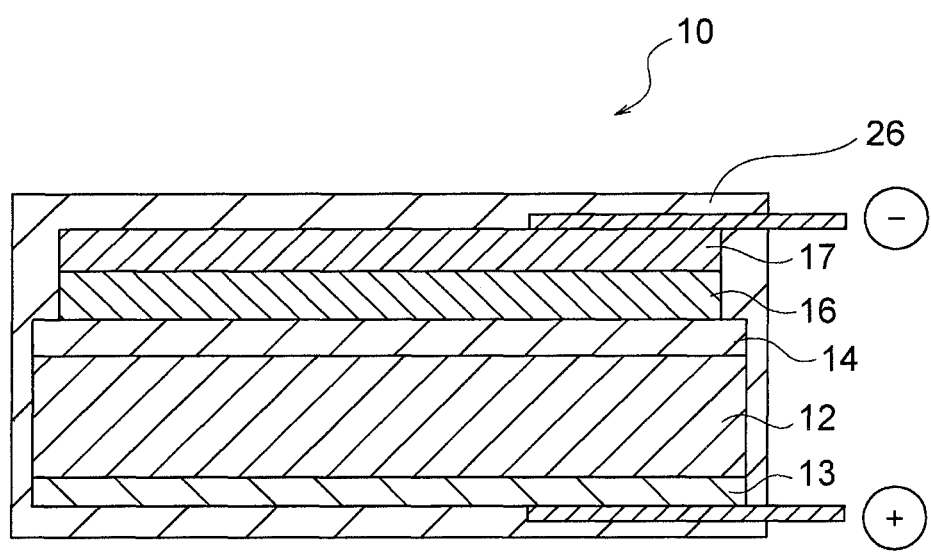
FIG. 1 is a schematic sectional view illustrating an exemplary secondary battery according to the present invention.

FIG. 1 schematically illustrates one example of the secondary battery according to the present invention. A secondary battery 10 illustrated in FIG. 1 comprises a positive electrode plate 12, an inorganic solid electrolyte layer 14, and a negative electrode plate 16. The positive electrode plate 12 is composed of an inorganic material comprising a positive electrode active material in an oxide form. The negative electrode plate 16 is composed of an inorganic material comprising a negative electrode active material in an oxide form. The positive electrode plate 12 and the negative electrode plate 16 each have a thickness of 25 µm or more. The secondary battery 10 is charged and discharged at a temperature of 100° C. or more. Thus, the secondary battery comprising the positive electrode plate 12 and the negative electrode plate 16 each composed of an inorganic material comprising an oxide and the inorganic solid electrolyte layer 14 can have a large capacity and can provide rapid charge/discharge at a high cycle capacity retention through control of the thickness of the positive electrode plate 12 and that of the negative electrode plate 16 to be 25 µm or more and charging/discharging at a temperature of 100° C. or more. In other words, the large thicknesses of the positive electrode plate 12 and the negative electrode plate 16 described above result in a large capacity of the secondary battery 10. The positive electrode plate 12 and the negative electrode plate 16 are ceramic members. The thicknesses thereof can be increased to a proper level, providing a secondary battery having a high capacity and a high energy density. The rapid charge/discharge of the secondary battery 10 can be achieved through charging/discharging of the battery at a high temperature of 100° C. or more. Thus, the secondary battery 10 can be operated at a high rate with safety at such a temperature. In addition, the high capacity can be maintained, that is, the high cycle capacity retention can be attained even after rapid charge/discharge is repeated.

Accordingly, the secondary battery 10 is charged and discharged at an operating temperature of 100° C. or more. The operating temperature is preferably 100 to 300° C., more preferably 100 to 200° C., still more preferably 100 to 150° C. Heating means for generating the operating temperature may be a variety of heaters and a variety of apparatuses and devices which generate heat. Preferred examples thereof include ceramic heaters of a resistance heating type. In other words, the secondary battery 10 according to the present invention is preferably provided as a secondary battery system including a heating means.

The positive electrode plate 12 is composed of an inorganic material. The inorganic material comprises a positive electrode active material in an oxide form. Any positive electrode active material in an oxide form may be appropriately selected according to the type of the secondary battery 10 without limitation. For example, lithium composite oxide is a preferred positive electrode active material for lithium secondary batteries. The lithium composite oxide is represented by $Li_xMO_2$ (where $0.05<x<1.10$; M is at least one transition metal; and M typically comprises at least one metal selected from the group consisting of Co, Ni, Mn, and Al). The lithium composite oxide has a layered rock-salt structure. The layered rock-salt structure refers to a crystal structure composed of an alternate lamination of a lithium layer and a layer of a transition metal other than lithium with an oxygen layer interposed therebetween, i.e., a crystal structure composed of a transition metal ion layer, a layer of a pure lithium element, and interposed oxide ions (typically an $\alpha$-$NaFeO_2$ structure, in which a transition metal and lithium are regularly disposed in the [111] axial direction of a cubic rock-salt structure). Examples of the lithium composite oxide include $Li_xCoO_2$ (lithium cobaltite), $Li_xNiO_2$ (lithium nickelate), $Li_xMnO_2$ (manganate lithium), $Li_xNiMnO_2$ (nickel.manganate lithium), $Li_xNiCoO_2$ (nickel.lithium cobaltite), $Li_xCoNiMnO_2$ (cobalt.nickel.manganate lithium), $Li_xCoMnO_2$ (cobalt.manganate lithium), $Li_2MnO_3$, and solid solutions thereof. Particularly preferred is $Li_xCoO_2$ (lithium cobaltite, typically $LiCoO_2$). The lithium composite oxide may contain one or more elements selected from the group consisting of Mg, Al, Si, Ca, Ti, V, Cr, Fe, Cu, Zn, Ga, Ge, Sr, Y, Zr, Nb, Mo, Ag, Sn, Sb, Te, Ba, Bi, and W. Alternatively, materials having other structures, such as $LiMn_2O_4$ materials having a spinel structure and $LiMPO_4$ materials having an olivine structure (where M is at least one element selected from the group consisting of Fe, Co, Mn, and Ni) may also be suitably used.

Physical and electrical interconnections between the particles of the positive electrode active material contained in the positive electrode plate 12 are preferred to increase the energy density and the electron conductivity and the ionic conductivity at the same time. Accordingly, the positive electrode plate 12 is preferably a sintered plate (such as a sintered plate of a lithium composite oxide). In the case of the sintered plate, the packing density of the positive electrode active material (such as a lithium composite oxide) increases because the positive electrode plate contains no binder. Such a high packing density results in a high capacity and favorable charge/discharge efficiency. If the binder is contained in the green sheet, it burns out during firing and thus is not contained in the positive electrode plate.

Figure 2:
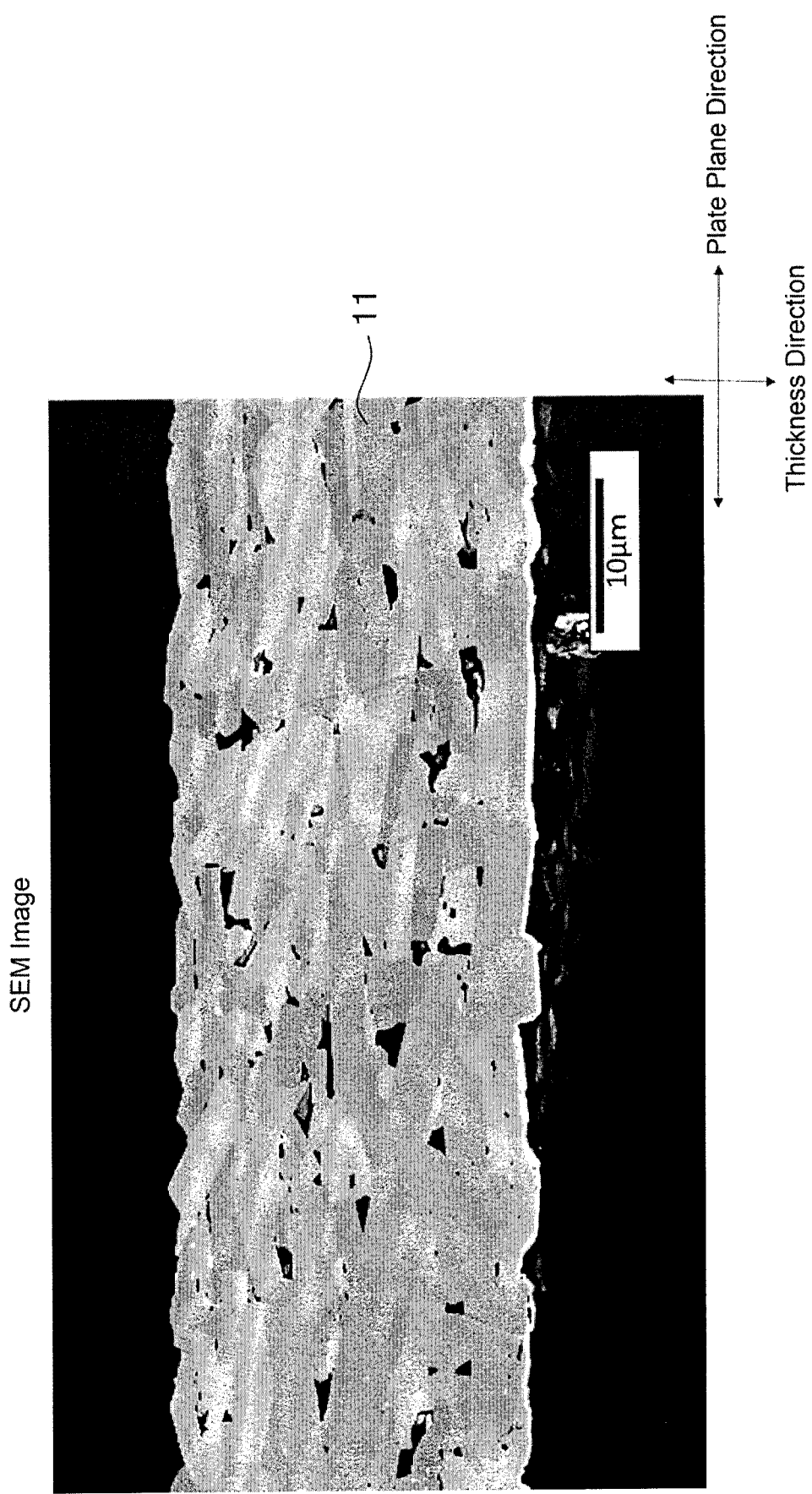
FIG. 2 is an SEM image illustrating one example cross-section vertical to the plane of an oriented positive electrode plate.
Figure 3:
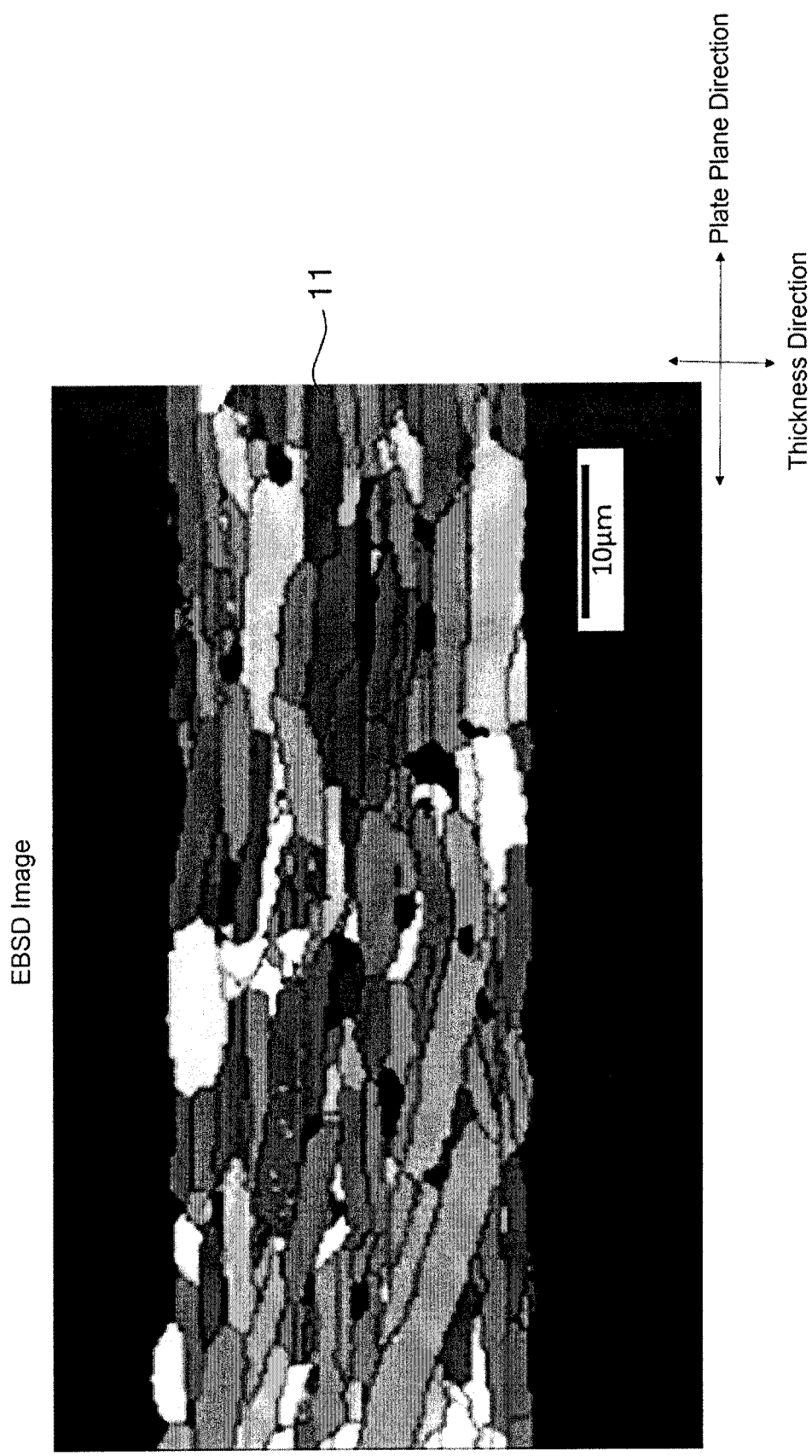
FIG. 3 is an EBSD image of a cross-section of the oriented positive electrode plate illustrated in FIG. 2.
Figure 4:
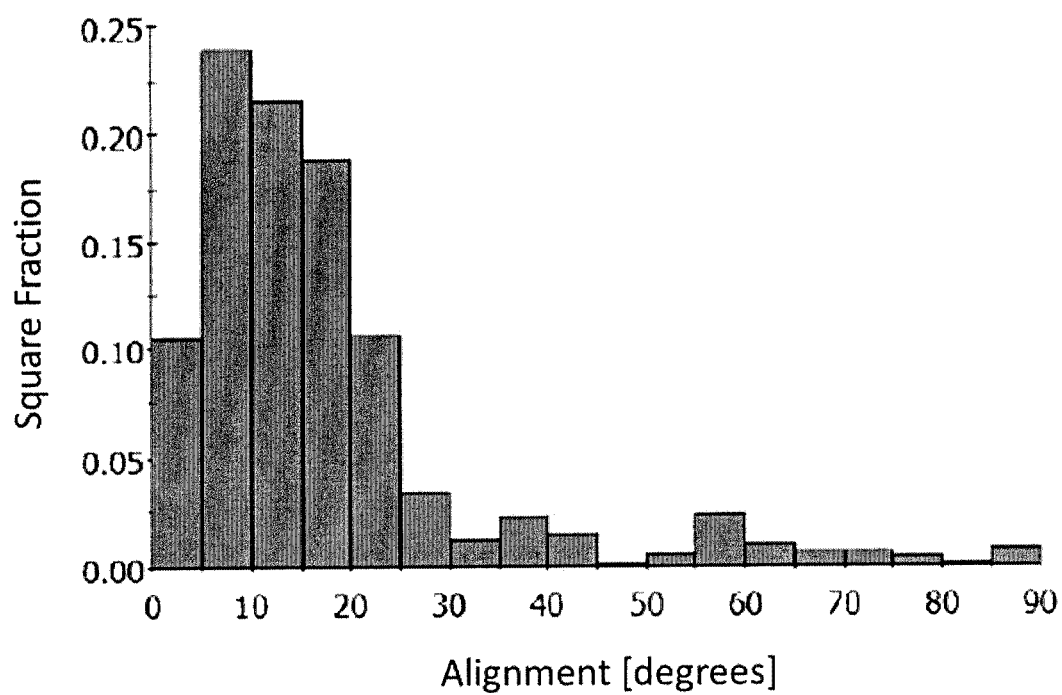
FIG. 4 is a histogram illustrating an area-based distribution of an orientation angle of primary particles in the EBSD image of FIG. 3.

In the case where the positive electrode plate 12 is a sintered plate of a lithium composite oxide, the positive electrode plate 12 is preferably an oriented positive electrode plate comprising primary particles which are composed of a lithium composite oxide, and are oriented at an average orientation angle of more than 0° and 30° or less to the plane of the positive electrode plate. Such an oriented positive electrode plate can be prepared in accordance with the method described in Patent Document 3 (WO2017/146088). FIG. 2 illustrates one example of an SEM image of a cross-section vertical to the plate face of the oriented positive electrode plate while FIG. 3 illustrates an electron backscatter diffraction (EBSD) image of the cross-section vertical to the plate face of the oriented positive electrode plate. FIG. 4 illustrates a histogram of an area-based distribution of the orientation angle of the primary particles 11 in the EBSD image of FIG. 3. Discontinuity of the crystal orientation can be observed from the EBSD image illustrated in FIG. 3. In FIG. 3, the orientation angles of the primary particles 11 are represented by shaded colors, and a darker color indicates a smaller orientation angle. The orientation angle indicates the tilt angle formed between the (003) plane of each primary particle 11 and the plate face. In FIGS. 2 and 3, pores in the inside of the oriented positive electrode plate are represented by a color of black.

As illustrated in FIGS. 2 and 3, the positive electrode plate 12 is preferably an oriented sintered body composed of primary particles 11 bonded to each other. The primary particles 11 are mainly platy, and may comprise those having cuboidal, cubic, and spherical shapes. The primary particles 11 each may have any cross-sectional shape, and may have rectangular, polygonal other than rectangular, circular, or oval shapes, or complex shapes other than these.

As illustrated in FIGS. 2 and 3, the average of the orientation angles of the primary particles 11 composed of a lithium composite oxide, i.e., the average orientation angle is preferably more than 0° and 30° or less. Such an average orientation angle can further reduce the degradation of the battery when operated under a high temperature condition. This is believed to be caused by contribution of a variety of advantages described below. First, the primary particles 11 are laid down with a tilt angle from the thickness direction, enhancing the adhesion between the primary particles. As a result, the ion conductivity between a primary particle 11 and other primary particles 11 adjacent to the primary particle 11 in the longitudinal direction can be enhanced, improving the rate characteristics of the battery. Second, the cycle characteristics of the battery can be improved. In other words, the primary particles 11 stretch in a direction vertical to the (003) plane in response to intercalation and deintercalation of lithium ions. In this action, a small tilt angle of the (003) plane of the primary particles from the plane of the plate can reduce the expansion/contraction rate of the oriented positive electrode plate 12 along the plane of the plate, reducing the stress generated between the oriented positive electrode plate 12 and the inorganic solid electrolyte layer 14. Third, the rate characteristics of the battery can be further improved. Such an effect is achieved for the following reason: As described above, the expansion/contraction of the positive electrode plate 12 is more significant along the thickness than along the plane of the plate during intercalation and deintercalation of lithium ions, resulting in smooth expansion/contraction of the positive electrode plate 12, and thus smooth intercalation and deintercalation of carrier ions (such as lithium ions).

The average orientation angle of the primary particles 11 composed of a lithium composite oxide can be determined as follows: (i) A positive electrode plate is polished with a cross-section polisher (CP). (ii) The resulting cross-section of the positive electrode plate (cross-section vertical to the plate faces of the positive electrode plate) is EBSD measured at a predetermined magnification (for example, 1000×) and a predetermined view field (for example, 125 μm by 125 μm). (iii) In all the particles specified in the EBSD image, the angles defined between the (003) planes of the primary particles and the plate face of the positive electrode plate (i.e., the tilt of crystal orientation from the (003) plane) are determined as tilt angle, and (iv) the average of these angles is calculated. The primary particles 11 have an average orientation angle of preferably 30° or less, more preferably 25° or less to further improve the rate characteristics of the battery. The primary particles 11 have an average orientation angle of preferably 2° or more, more preferably 5° or more to further improve the rate characteristics of the battery.

Although the orientation angle of the primary particles 11 composed of a lithium composite oxide may have a broad distribution from 0° to 90° as illustrated in FIG. 4, most of the orientation angles is preferably distributed to fall within the range of more than 0° and 30° or less. In other words, the oriented sintered body forming the oriented positive electrode plate 12 has a cross-section analyzed by EBSD as follows: Among the primary particles 11 contained in the analyzed cross-section, the total area of the primary particles 11 having an orientation angle of more than 0° and 30° or less to the plate faces of the oriented positive electrode plate 12 (hereinafter, referred to as small-angle primary particles) occupies preferably 70% or more, more preferably 80% or more of the total area of the primary particles 11 included in the cross-section (specifically, thirty primary particles 11 used in the calculation of the average orientation angle). Such a distribution of the primary particles increases the proportion of the primary particles 11 having high mutual adhesion, further improving the rate characteristics of the battery. More preferably, among the small-angle primary particles, the total area of those having an orientation angle of 20° or less occupies 50% or more of the total area of the thirty primary particles 11 used in the calculation of the average orientation angle. Still more preferably, among the small-angle primary particles, the total area of those having an orientation angle of 10° or less occupies 15% or more of the total area of the thirty primary particles 11 used in the calculation of the average orientation angle.

Because the primary particles 11 composed of lithium composite oxide are mainly platy, as illustrated in FIGS. 2 and 3, the cross-section of each primary particle 11 extends in a predetermined direction and typically has a substantially rectangular shape. In other words, the oriented sintered body has a cross-section analyzed by EBSD as follows: Among the analyzed primary particles 11 found in the cross-section, the total area of primary particles 11 having an aspect ratio of 4 or more occupies preferably 70% or more, more preferably 80% or more of the total area of the primary particles 11 (specifically, thirty primary particles 11 used in the calculation of the average orientation angle) in the cross-section. Specifically, the shape of the primary particles in an EBSD image illustrated in FIG. 3 can further improve the mutual adhesion of the primary particles 11, as a result, further improving the rate characteristics of the battery. The aspect ratio of the primary particle 11 is determined by dividing the maximum Feret's diameter by the minimum Feret's diameter of the primary particle 11. The maximum Feret's diameter is the longest distance between two parallel tangents of the primary particle 11 on the EBSD cross-sectional image. The minimum Feret's diameter is the shortest distance between two parallel tangents of the primary particle 11 on the EBSD image.

The primary particles in the oriented sintered body preferably have a mean particle size of 5 μm or more. Specifically, the mean particle size of the thirty primary particles 11 used in the calculation of the average orientation angle is preferably 5 μm or more, more preferably 7 μm or more, still more preferably 12 μm or more. Such a mean particle size can reduce the number of grain boundaries between the primary particles 11 in the direction of the flow of lithium ions, resulting in an improvement in the overall ion conductivity of the battery. For this reason, the rate characteristics of the battery can be further improved. The mean particle size of the primary particles 11 is an arithmetic average of the equivalent circle diameters of the primary particles 11. The equivalent circle diameter refers to the diameter of a circle having the same area as that of a primary particle 11 on the EBSD image.

The positive electrode plate 12 preferably contains pores. The pores in the positive electrode plate 12 effectively or uniformly relax stress generated by stretching of the crystal lattice accompanied by intercalation and deintercalation of carrier ions (such as lithium ions) in the charge/discharge cycle, and thus minimize cracking in the grain boundaries accompanied by the repeated charge/discharge cycle. The orientation of the pores contained in the positive electrode plate 12 is preferred to enhance the relaxation effect. For example, the pores can be oriented by use of platy crystals for raw material particles. In particular, this effect is noticeable during high-speed charge/discharge at high temperature.

The average pore aspect ratio in the positive electrode plate 12 is 1.2 or more, preferably 1.5 or more, still more preferably 1.8 or more. It is believed that the shape of the pores having anisotropy defined by such an aspect ratio effectively disperses the stress occurring during bending or charge/discharge of the battery, achieving superior characteristics, such as high bending resistance and rapid charge, of the battery. The average pore aspect ratio can have any upper limit. The average pore aspect ratio is preferably 30 or less, more preferably 20 or less, still more preferably 15 or less. The average pore aspect ratio in the positive electrode plate 12 is the average of the aspect ratios of the pores contained in the positive electrode plate 12. The aspect ratio of each of the pores is the ratio of the length in the longitudinal direction to the length in the lateral direction of a pore. The average pore aspect ratio can be determined through image analysis of an SEM cross-sectional image of the positive electrode plate 12, as described later in detail in the example section.

The positive electrode plate 12 has a porosity of preferably 2 to 20%, more preferably 3 to 20%, still more preferably 5 to 18%. A porosity in such a range can provide a desirable stress relaxation effect by the pores and a desirable effect of increasing the capacity. The porosity of the positive electrode plate 12 is the volume rate of the pores (open and closed pores) in the positive electrode plate 12, and can be determined through image analysis of an SEM cross-sectional image of the positive electrode plate 12 as described later in detail in the example section.

The positive electrode plate 12 has a thickness of 25 μm or more, preferably 30 μm or more, more preferably 40 μm or more, particularly preferably 50 μm or more, most preferably 55 μm or more to increase the capacity of the active material per unit area and thus the energy density of the lithium secondary battery 10. Although the upper limit of the thickness can be any value, the oriented positive electrode plate 12 has a thickness of preferably 400 μm or less, more preferably 300 μm or less, still more preferably 250 μm or less, particularly preferably 200 μm or less to prevent degradation of battery characteristics accompanied by repeated charge/discharge (in particular, an increase in resistance). The positive electrode plate 12 has a dimension of preferably 5 mm by 5 mm or more, more preferably 10 mm by 10 mm or more, in other words, preferably 25 mm² or more, more preferably 100 mm² or more.

The negative electrode plate 16 is composed of an inorganic material. The inorganic material comprises a negative electrode active material in an oxide form. Any negative electrode active material in an oxide form may be appropriately selected according to the type of the secondary battery 10 without limitation. A preferred negative electrode active material is an oxide containing at least Ti. For example, in the case of lithium secondary batteries, preferred examples of the negative electrode active material include lithium titanate $Li_4Ti_5O_{12}$ (hereinafter, referred to as LTO), niobium titanium composite oxide $Nb_2TiO_7$, and titanium oxide $TiO_2$. More preferred are LTO and $Nb_2TiO_7$. Although it is known that LTO typically has a spinel structure, this compound may have another structure during charge/discharge of the battery. For example, in LTO, the reaction progresses in the presence of two phases of LTO, i.e., $Li_4Ti_5O_{12}$ (spinel structure) and $Li_7Ti_5O_{12}$ (rock-salt structure). Accordingly, LTO can have a structure other than the spinel structure.

Physical and electrical interconnections between particles of the negative electrode active material contained in the negative electrode plate 16 are preferred to increase the energy density and increase the electron conductivity and ionic conductivity at the same time. Accordingly, the negative electrode plate 16 is preferably a sintered plate (for example, a sintered plate of LTO or $Nb_2TiO_7$). In the case of the sintered plate, the packing density of the negative electrode active material (such as LTO or $Nb_2TiO_7$) increases because the negative electrode plate contains no binder. Such a high packing density results in a high capacity and high charge/discharge efficiency. If the binder is contained in the green sheet, it burns out during firing and thus is not contained in the negative electrode plate. The LTO sintered plate can be prepared in accordance with the method described in Patent Document 2 (JP2015-185337A).

The negative electrode plate 16 preferably contains pores. The pores in the negative electrode plate 16 effectively or uniformly relax stress generated by stretching of the crystal lattice accompanied by intercalation and deintercalation of carrier ions (such as lithium ions) in the charge/discharge cycle, and thus minimize cracking in the grain boundaries accompanied by the repeated charge/discharge cycle.

The negative electrode plate 16 has a porosity of preferably 2 to 20%, more preferably 3 to 20%, still more preferably 5 to 18%. A porosity in such a range can provide a desirable stress relaxation effect by the pores and a desirable effect of increasing the capacity. The porosity of the negative electrode plate 16 is the volume rate of pores (open pores and closed pores) in the negative electrode plate 16, and can be determined through image analysis of an SEM cross-sectional image of the negative electrode plate 16 as described later in detail in the example section.

The negative electrode plate 16 has a thickness of 25 μm or more, preferably 30 μm or more, more preferably 40 μm or more, particularly preferably 50 μm or more, most preferably 55 μm or more to increase the capacity of the active material per unit area and thus the energy density of the lithium secondary battery 10. Although the upper limit of the thickness can be any value, the negative electrode plate 16 has a thickness of preferably 400 μm or less, more preferably 300 μm or less to prevent degradation of battery characteristics accompanied by repeated charge/discharge (in particular, an increase in resistance). The negative electrode plate 16 has a dimension of preferably 5 mm by 5 mm or more, more preferably 10 mm by 10 mm or more, in other words, preferably 25 mm² or more, more preferably 100 mm² or more.

The ratio C/A of the capacity A of the negative electrode plate 16 to the capacity C of the positive electrode plate 12 satisfies the relation represented by preferably 1.0<C/A<1.6, more preferably 1.005<C/A<1.500. If the capacity C of the positive electrode plate 12 is higher than the capacity A of the negative electrode plate 16, the secondary battery 10 is operated only by the capacity of the negative electrode plate 16, reducing the region of the carrier (such as lithium) to be used within the positive electrode plate 12. As a result, the expansion/contraction of the positive electrode plate 12 accompanied by intercalation and deintercalation of the carrier ions (such as lithium ions) can be reduced. This effect is noticeable under a high temperature condition. Although the reason is not clear, a possible factor is rapid diffusion of the carrier inside the positive electrode plate 12 and the negative electrode plate 16 and thus a small difference in the carrier concentration between the insides thereof (which leads to a difference between expansion and contraction).

A ratio C/A in this range can be provided through appropriate control of parameters, such as the thickness and the porosity, of the positive electrode plate 12 and parameters, such as the thickness and the porosity, of the negative electrode plate 16. The ratio C/A is preferably determined as follows:

(i) The actual electric capacity (mAh) at 25° C. per an area of 1 cm$^2$ of the positive electrode plate 12 is determined as the capacity C of the positive electrode plate 12. This actual electric capacity corresponds to the electric capacity when a battery is charged for 10 hours at a current of 0.2 C under a constant current and a constant voltage where the potential to lithium metal is 4.25 V, and then is discharged at a constant current of 0.2 C until the potential to lithium metal reaches 3.0 V.

(ii) The capacity A of the negative electrode plate is determined from the actual electric capacity (mAh) per an area of 1 cm$^2$ of the negative electrode plate 16 at 25° C. of the negative electrode plate 16. This actual electric capacity corresponds to the electric capacity when the battery is charged for 10 hours at a current of 0.2 C under a constant current and a constant voltage where the potential to lithium metal is 0.8 V, and then is discharged at a constant current of 0.2 C until the potential to lithium metal reaches 2.0 V.

(iii) Finally, the ratio C/A of the capacity C of the positive electrode plate 12 to the capacity A of the negative electrode plate 16 is calculated.

The inorganic solid electrolyte layer 14 may be any layer comprising an inorganic solid electrolyte, and may be appropriately selected according to the type of the secondary battery 10. For example, the inorganic solid electrolyte for lithium secondary batteries is desirably a lithium ion-conductive material. Preferred examples of the lithium ion-conductive material for the inorganic solid electrolyte layer 14 include garnet ceramic materials, nitride ceramic materials, perovskite ceramic materials, phosphate ceramic materials, sulfide ceramic materials, borosilicate ceramic materials, lithium halide materials, and polymer materials. More preferred is at least one material selected from the group consisting of garnet ceramic materials, nitride ceramic materials, perovskite ceramic materials, and phosphate ceramic materials. Examples of the garnet ceramic materials include Li—La—Zr—O materials (such as $Li_7La_3Zr_2O_{12}$), Li—La—Ta—O materials (such as $Li_7La_3Ta_2O_{12}$). Examples of the nitride ceramic materials include $Li_3N$. Examples of the perovskite ceramic materials include Li—La—Zr—O materials (such as $LiLa_{1-x}Ti_xO_3$ (where 0.04≤x≤0.14)). Examples of the phosphate ceramic materials include lithium phosphate, nitrogen-substituted lithium phosphate (LiPON), Li—Al—Ti—P—O, Li—Al—Ge—P—O, and Li—Al—Ti—Si—P—O (such as $Li_{1+x+y}Al_xTi_{2-x}Si_y$-$P_{3-y}O_{12}$ (where 0≤x≤0.4, 0<y≤0.6)). Examples of the sulfide ceramic materials include $LiOH$—$Li_2SO_4$, and $Li_3BO_3$—$Li_2SO_4$—$Li_2CO_3$. Examples of the borosilicate ceramic materials include $Li_2O$—$B_2O_3$—$SiO_2$. Examples of the lithium halide materials include $Li_2OX$ (where X is Cl and/or Br), $Li_e(OH)_{1-a}F_aCl$ (where 0≤a≤0.3), and $Li_2OHX$ (where X is Cl and/or Br). Particularly preferred is $Li_3OCl$.

From the viewpoint of high ion conductivity, the lithium ion-conductive material which can form the inorganic solid electrolyte layer 14 is particularly preferably $Li_3OX$ (where X is Cl and/or Br), $Li_2(OH)_{1-a}F_aCl$ (where 0≤a≤0.3), or $Li_2OHX$ (where X is Cl and/or Br), most preferably $Li_3OCl$. In this case, the inorganic solid electrolyte layer 14 is preferably formed as follows, for example: (i) A solid electrolyte powder, such as $Li_3OX$, is placed on one of the positive electrode plate 12 and the negative electrode plate 16, and the other of the negative electrode plate 16 and the positive electrode plate 12 is placed on the solid electrolyte powder. (ii) The negative electrode plate 16 is pressed against the positive electrode plate 12 (or vice versa) at a temperature of 100 to 600° C. to fuse the solid electrolyte powder into gaps in the positive electrode plate 12 and the negative electrode plate 16. (iii) The workpiece is spontaneously or forcibly cooled to solidify the electrolyte. Lithium phosphate oxynitride (UPON) ceramic materials are also preferred. LiPON is a group of compounds represented by a composition $Li_{2.9}PO_{3.3}N_{0.46}$, such as $Li_aPO_bN_c$ (where a is 2 to 4, b is 3 to 5, and c is 0.1 to 0.9). The inorganic solid electrolyte layer 14 can be prepared by any process. Examples of the process include gas phase processes such as sputtering and CVD; liquid phase processes such as screen printing and spin coating, a process of compressing powder; a process of heating a raw material to a temperature higher than its melting point and then solidifying the raw material; and a process of heating powder to a temperature higher than its melting point while compressing the powder and then solidifying the powder.

Although the inorganic solid electrolyte layer 14 can have any dimension, the thickness is preferably 0.0005 mm to 1.0 mm, more preferably 0.001 mm to 0.1 mm, still more preferably 0.002 to 0.05 mm from the viewpoint of the charge/discharge rate characteristics of the battery and the mechanical strength of the layer.

The thickness Te of the inorganic solid electrolyte layer, the thickness Tc of the positive electrode plate, and the thickness Ta of the negative electrode plate satisfy the relation represented by preferably Te/(Tc+Ta)<0.25, more preferably 0.002<Te/(Tc+Ta)<0.25, still more preferably 0.005<Te/(Tc+Ta)<0.2. If the thicknesses Te, Tc, and Ta are controlled within such a range, the thickness Te of the inorganic solid electrolyte layer can be considerably lower than the total thickness (Ta+Tc) of the positive electrode plate and the negative electrode plate, resulting in a significantly high energy density of the secondary battery 10.

The positive electrode plate 12 is preferably provided with a positive electrode collector 13 on a surface remote from the inorganic solid electrolyte layer 14. The negative electrode plate 16 is preferably provided with a negative electrode collector 17 on a surface remote from the inorganic solid electrolyte layer 14. Examples of the materials for the positive electrode collector 13 and the negative electrode collector 17 include platinum (Pt), platinum (Pt)/palladium (Pd), gold (Au), silver (Ag), aluminum (Al), copper (Cu), indium-tin oxide (ITO) film, and nickel (Ni).

The positive electrode plate 12, the inorganic solid electrolyte layer 14, and the negative electrode plate 16 are accommodated in a container 18. The container 18 can be of any type which can accommodate a unit cell or a stack of unit cells stacked in series or in parallel. In particular, the secondary battery 10, which has no concern about leakage of an electrolyte solution, can be accommodated in a container 18 having a relatively simple form, and can be packaged with a wrapping material. For example, a chip form for packaging in electronic circuits and a form of a laminate cell for application to thin and wide spaces (such as a lamination of aluminum (Al) and polypropylene (PP)) can be used. The positive electrode collector 13 and/or the negative electrode collector 17 may be configured to serve as part of the container 18. To further increase the heat resistance, polypropylene may be replaced with a heat-resistant resin, such as polychlorotrifluoroethylene (PCTFE), tetrafluoroethylene-perfluoro(alkyl vinyl ether) copolymer (PFA), polyimide, or polyamide.

EXAMPLES

The present invention will be described in more detail by way of Examples, where $LiCoO_2$ is abbreviated to "LCO", and $Li_4Ti_5O_{12}$ is abbreviated to "LTO".

Examples 1 to 5

(1) Preparation of Positive Electrode Plate (1a) Preparation of LCO Green Sheet $Co_3O_4$ powder (available from Seido Chemical Industry Co., Ltd., mean particle size: 0.9 μm) and $Li_2CO_3$ powder (available from The Honjo Chemical Corporation) were weighed such that the molar ratio Li/Co was 1.02, and were mixed. The mixture was kept at 750° C. for five hours. The resulting powder was pulverized with a pot mill such that the volume-based particle size D50 was 0.4 μm, yielding a powder composed of platy LCO particles. The LCO powder (100 parts by weight), a dispersive medium (toluene:isopropanol=1:1) (100 parts by weight), a binder (polyvinyl butyral: Product No. BM-2, available from Sekisui Chemical Co., Ltd.) (10 parts by weight), a plasticizer (di-2-ethylhexyl phthalate (DOP), available from Kurogane Kasei Co., Ltd.) (4 parts by weight), and a dispersant (product name: RHEODOL SP-O30, available from Kao Corporation) (2 parts by weight) were mixed. The mixture was defoamed with stirring under reduced pressure to prepare an LCO slurry with a viscosity of 4000 cP. The viscosity was measured with an LVT viscometer available from Brookfield. The resulting slurry was shaped into an LCO green sheet onto a PET film by doctor blading. The thickness of the LCO green sheet was controlled such that the thickness after firing was 25 μm (Example 1) or 200 μm (Examples 2 to 5 and 7).

(1b) Preparation of $Li_2CO_3$ Green Sheet (Excess Lithium Source)

$Li_2CO_3$ raw material powder (volume-based particle size D50: 2.5 μm, available from The Honjo Chemical Corporation) (100 parts by weight), a binder (poly(vinyl butyral): Product No. BM-2, available from Sekisui Chemical Co., Ltd.) (5 parts by weight), a plasticizer di-2-ethylhexyl phthalate (DOP), available from Kurogane Kasei Co., Ltd.) (2 parts by weight), and a dispersant (RHEODOL SP-O30, available from Kao Corporation) (2 parts by weight) were mixed. The mixture was defoamed with stirring under reduced pressure to prepare an $Li_2CO_3$ slurry with a viscosity of 4000 cP. The viscosity was measured with an LVT viscometer available from Brookfield. The resulting $Li_2CO_3$ slurry was shaped into an $Li_2CO_3$ green sheet on a PET film by doctor blading. The dry thickness of the $Li_2CO_3$ green sheet was set such that the molar ratio Li/Co of the Li content in the $Li_2CO_3$ green sheet to the Co content in the LCO green sheet had a predetermined value.

(1c) Preparation of Sintered LCO Plate

The LCO green sheet was removed from the PET film, and was cut into a 50 mm square. The cut piece was placed on the center of a bottom magnesia setter (dimension: 90 mm square, height: 1 mm). The LCO green sheet was heated to 600° C. at a heating rate of 200° C./h, and was degreased for three hours. The LCO green sheet was then kept at 900° C. for three hours to calcine the LCO green sheet. The dried $Li_2CO_3$ green sheet was cut into a size such that the molar ratio Li/Co of the Li content in the $Li_2CO_3$ green sheet to the Co content in the calcined LCO plate was 0.5. The cut piece of the $Li_2CO_3$ green sheet, as an excess lithium source, was placed on the calcined LCO plate, and a porous top magnesia setter was placed thereon. The calcined LCO plate and the green sheet piece sandwiched between the top and bottom setters were placed into an alumina sheath of a 120 mm square (available from Nikkato K.K.). At this time, the alumina sheath was not tightly sealed, and was covered with a lid with a gap of 0.5 mm. The resulting laminate was heated to 600° C. at a heating rate of 200° C./h, and was degreased for three hours. The laminate was then heated to 800° C. at 200° C./h, and was kept for five hours. The laminate was then fired to 900° C. at 200° C./h, and was kept for 24 hours. After the firing, the fired laminate was cooled to room temperature, and was removed from the alumina sheath. Thus, the sintered LCO plate was yielded as a positive electrode plate. An Au film (thickness: 100 nm) as a collecting layer was formed on a plate face of the sintered LCO plate by sputtering where the plate face had been in contact with the bottom setter. The workpiece was then processed with a laser into a shape of a square of 10 mm by 10 mm.

(2) Preparation of Negative Electrode Plate (2a) Preparation of LTO Green Sheet

LTO powder (volume-based particle size D50: 0.06 μm, available from Sigma-Aldrich Japan, LLC.) (100 parts by weight), a dispersive medium (toluene:isopropanol=1:1) (100 parts by weight), a binder (polyvinyl butyral: Product No. BM-2, available from Sekisui Chemical Co., Ltd.) (20 parts by weight), a plasticizer (di-2-ethylhexyl phthalate (DOP), available from Kurogane Kasei Co., Ltd.) (4 parts by weight), and a dispersant (product name RHEODOL SP-O30, available from Kao Corporation) (2 parts by weight) were mixed. The mixture of the negative electrode raw materials was defoamed with stirring under reduced pressure to prepare an LTO slurry with a viscosity of 4000 cP. The viscosity was measured with an LVT viscometer available from Brookfield. The resulting slurry was shaped into an LTO green sheet on a PET film by doctor blading. The dry thickness of the LTO green sheet was controlled such that the thickness after firing was 28 μm (Example 1), 224 μm (Examples 2 and 3), 257 μm (Example 4), or 161 μm (Example 5).

(2b) Firing of LTO Green Sheet

The green sheet was cut into a 25 mm square with a cutter knife, and was placed on an embossed zirconia setter. The green sheet on the setter was placed in an alumina sheath. The workpiece was kept at 500° C. for five hours. The workpiece was then heated at a heating rate of 200° C./h, and was fired at 800° C. for five hours. An Au film (thickness: 100 nm) as a collecting layer was formed on a plate face of the sintered LTO plate by sputtering where the plate face had been in contact with the setter. The workpiece was then processed with a laser into a shape of a square of 10 mm by 10 mm.

(3) Preparation of Inorganic Solid Electrolyte

LiOH (4.790 g) and LiCl (4.239 g) were dissolved in a small amount of deionized water to prepare an aqueous solution of raw materials. The amounts of these precursors were adjusted so as to correspond to the stoichiometric proportion in the formula $Li_3OCl+H_2O$. Most of water was removed with a rotary evaporator on a hot bath at a temperature of about 90° C. The remaining solid was placed into an alumina boat. The boat was placed into an electric furnace, and was heated in vacuum at a temperature of about 280° C. for 48 hours to yield an inorganic solid electrolyte, i.e., $Li_3OCl$ powder as a reaction product.

(4) Preparation of Battery

The $Li_3OCl$ powder was placed onto the positive electrode plate, and they were heated on a hot plate at 400° C. The negative electrode plate was placed on the $Li_3OCl$ powder under pressure. At this time, the Li$_3$OCl powder was fused, and was then solidified to form a solid electrolyte layer having a final thickness of 20 μm. A cell composed of the positive electrode plate, the solid electrolyte layer, and the negative electrode plate was used to prepare a laminate battery.

(5) Evaluations

The LCO positive electrode plate prepared in Section (1), the LTO negative electrode plate prepared in Section (2), and the battery prepared in Section (4) were evaluated as follows.

<Average Orientation Angle of Primary Particles>

The LCO positive electrode plate was polished with a cross-section polisher (CP) (available from JEOL, Ltd., IB-15000CP). The resulting cross-section of the positive electrode plate (cross-section vertical to the plate face of the positive electrode plate) was observed by EBSD measurement at a view field (125 μm by 125 μm) of 1000× to obtain an EBSD image. The EBSD measurement was performed with a Schottky field emission scanning electron microscope (available from JEOL, Ltd., type JSM-7800F). In all the particles specified in the EBSD image, the angles defined between the (003) planes of the primary particles and the plate face of the positive electrode plate (i.e., the tilt of the crystal orientation from the (003)) were determined as tilt angles. The average of these angles was calculated as the average orientation angle of primary particles (average tilt angle).

<Thickness of Plate>

The LCO positive electrode plate and the LTO negative electrode plate were polished with a cross-section polisher (CP) (available from JEOL, Ltd., IB-15000CP). The cross-sections of the electrode plates were observed with an SEM (available from JEOL, Ltd., JSM6390LA) to determine the thicknesses of the electrode plates.

<Porosity>

The LCO positive electrode plate and the LTO negative electrode plate were polished with a cross-section polisher (CP) (available from JEOL, Ltd., IB-15000CP). The cross-sections of the electrode plates were observed with an SEM (available from JEOL, Ltd., JSM6390LA) at a view field (125 μm by 125 μm) of 1000×, and were subjected to image analysis. The total area of the pores in each electrode plate was divided by the area of the electrode plate and then multiplied by 100 to determine the porosity (%) of the electrode plate.

<Average Pore Aspect Ratio>

The LCO positive electrode plate was polished with a cross-section polisher (CP) (available from JEOL, Ltd., IB-15000CP). The cross-section of the positive electrode plate was observed with an SEM (available from JEOL, Ltd., JSM6390LA) at a view field (125 μm by 125 μm) of 1000×. The SEM image was binarized with image analysis software ImageJ, and pores were identified from the binarized image. With all the pores identified in the binarized image, the length in the longitudinal direction was divided by the length in the lateral direction to calculate the aspect ratios, and the average aspect ratio was determined.

<Ratio C/A>

An actual electric capacity (mAh) per an area of 1 cm$^2$ of the positive electrode plate at 25° C. was determined as the capacity C of the positive electrode plate. This actual electric capacity corresponded to the electric capacity when a battery was charged for 10 hours at a current of 0.2 C under a constant current and a constant voltage where the potential to lithium metal was 4.25 V, and then was discharged at a constant current of 0.2 C until the potential to lithium metal reached 3.0 V. An actual electric capacity (mAh) per an area of 1 cm$^2$ of the negative electrode plate at 25° C. was determined as the capacity A of the negative electrode plate. This actual electric capacity corresponded to the electric capacity when the battery was charged for 10 hours at a current of 0.2 C under a constant current and a constant voltage where the potential to lithium metal was 0.8 V, and then was discharged at a constant current of 0.2 C until the potential to lithium metal reached 2.0 V Finally, the ratio C/A of the capacity C of the positive electrode plate to the capacity A of the negative electrode plate was calculated.

<Cycle Capacity Retention>

The cycle capacity retention of a battery at an operating temperature of 100° C. or 300° C. was measured in the potential range of 2.7 V to 1.5 V by the following procedures.

(i) The battery was charged at a rate of 1 C under a constant current until the battery voltage reached 2.7 V, was charged under a constant voltage until the current value reached a rate of 0.2 C, and then was discharged at a rate of 1 C until the voltage reached 1.5 V. This charge/discharge cycle was repeated three times in total to measure the discharge capacities. The average thereof was defined as an initial discharge capacity.

(ii) The battery was charged and discharged at a charge rate of 2 C and a discharge rate of 2 C 100 times in total.

(iii) The battery was charged at a rate of 1 C under a constant current until the battery voltage reached 2.7 V, was charged under a constant voltage until the current reached a rate of 0.2 C, and then was discharged at a rate of 1 C until the voltage reached 1.5 V. This charge/discharge cycle was repeated three times in total to measure the discharge capacities. The average thereof was defined as the post-cycle discharge capacity.

(iv) The ratio of the post-cycle discharge capacity obtained in Procedure (iii) to the initial discharge capacity determined in Procedure (i) was calculated, and the resulting value was multiplied by 100 to determine the cycle capacity retention (%).

Example 6

A battery was prepared and evaluated as in Example 2 except that the negative electrode plate was prepared as follows. The result is as shown in Table 1.

(Preparation of Negative Electrode Plate)

TiO$_2$ powder (CR-ER available from Ishihara Sangyo Kaisha, Ltd.) and Nb$_2$O$_5$ powder (ceramic grade available from Mitsui Mining & Smelting Co., Ltd.) were weighed such that the molar ratio was 1:2, and were mixed. The mixed powder was kept at 1150° C. for five hours, and was pulverized with a pot mill into a volume-based particle size D50 of 0.5 μm. An Nb$_2$TiO$_7$ powder was thereby prepared. The Nb$_2$TiO$_7$ powder (100 parts by weight), a dispersive medium (toluene:isopropanol=1:1) (100 parts by weight), a binder (polyvinyl butyral: Product No. BM-2, available from Sekisui Chemical Co., Ltd.) (20 parts by weight), a plasticizer (di-2-ethylhexyl phthalate (DOP), available from Kurogane Kasei Co., Ltd.) (4 parts by weight), and a dispersant (product name RHEODOL SP-O30, available from Kao Corporation) (2 parts by weight) were mixed. The mixture of negative electrode raw materials was defoamed with stirring under reduced pressure to prepare an Nb$_2$TiO$_7$ slurry with a viscosity of 4000 cP. The viscosity was measured with an LVT viscometer available from Brookfield. The slurry was shaped into an Nb$_2$TiO$_7$ green sheet on a PET film by doctor blading. The dry thickness of the Nb$_2$TiO$_7$ green sheet was controlled such that the thickness after firing was 100 µm. The green sheet was cut into a 25 mm square with a cutter knife, and was placed onto an embossed zirconia setter. The green sheet on the setter was placed into an alumina sheath, and was kept at 500° C. for five hours. The workpiece was heated at a heating rate of 200° C./h, and was fired at 1100° C. for five hours. An Au film (thickness: 100 nm) as a collector was formed on a plate face of the Nb$_2$TiO$_7$ sintered plate by sputtering where the plate face had been in contact with the setter. The workpiece was then processed with a laser into a shape of a square of 10 mm by 10 mm.

Example 7 (Comparative)

A battery was prepared and evaluated as in Example 2 except that the battery operating temperature in the evaluation of the cycle capacity retention was 25° C. The result is shown in Table 1.

TABLE 1

| | Positive electrode plate | | | | Negative electrode plate | | | Solid electrolyte | | Operating | Cycle capacity |
|---|---|---|---|---|---|---|---|---|---|---|---|
| | Composition** | Average orientation angle of primary particles (°) | Thickness (µm) | Porosity (%) | Average pore aspect ratio | Composition** | Thickness (µm) | Porosity (%) | layer Composition | C/A | Temp. (° C.) | retention (%) |
| Ex. 1 | LCO | 15 | 25 | 10 | 1.2 | LTO | 28 | 3 | Li$_3$OCl | 1.15 | 100 | 97 |
| Ex. 2 | LCO | 15 | 200 | 10 | 1.2 | LTO | 224 | 3 | Li$_3$OCl | 1.15 | 100 | 96 |
| Ex. 3 | LCO | 15 | 200 | 10 | 1.2 | LTO | 224 | 3 | Li$_3$OCl | 1.15 | 300 | 90 |
| Ex. 4 | LCO | 15 | 200 | 10 | 1.2 | LTO | 257 | 3 | Li$_3$OCl | 1.001 | 100 | 92 |
| Ex. 5 | LCO | 15 | 200 | 10 | 1.2 | LTO | 161 | 3 | Li$_3$OCl | 1.599 | 100 | 95 |
| Ex. 6 | LCO | 15 | 200 | 10 | 1.2 | Nb$_2$TiO$_7$ | 100 | 3 | Li$_3$OCl | 1.15 | 100 | 97 |
| Ex. 7* | LCO | 15 | 200 | 10 | 1.2 | LTO | 224 | 3 | Li$_3$OCl | 1.15 | 25 | 70 |

*represents Comparative Example.
**LCO represents LiCoO$_2$, and LTO represents Li$_4$Ti$_5$O$_{12}$.

What is claimed is:

1. A secondary battery comprising:
   a positive electrode plate composed of an inorganic material comprising a positive electrode active material in an oxide form and having a thickness of 25 µm or more;
   a negative electrode plate composed of an inorganic material comprising a negative electrode active material in an oxide form and having a thickness of 25 µm or more; and
   an inorganic solid electrolyte layer,
   wherein the secondary battery is charged and discharged at a temperature of 100° C. or more;
   wherein the positive electrode plate is a sintered oriented positive electrode plate comprising primary particles composed of a lithium composite oxide, and
   wherein the primary particles are oriented at an average orientation angle of 5° or more and 30° or less to a plane of the positive electrode plate.

2. The secondary battery according to claim 1, wherein the temperature is 100 to 300° C.

3. The secondary battery according to claim 1, wherein the positive electrode plate has a thickness of 25 to 400 µm, and the negative electrode plate has a thickness of 25 to 400 µm.

4. The secondary battery according to claim 1, wherein a ratio C/A satisfies a relation represented by 1.0<C/A<1.6, where the ratio C/A is a ratio of a capacity C of the positive electrode plate to a capacity A of the negative electrode plate.

5. The secondary battery according to claim 1, wherein the positive electrode active material is a lithium composite oxide represented by Li$_x$MO$_2$, where 0.05<x<1.10, and M comprises at least one element selected from the group consisting of Co, Ni, Mn, and Al.

6. The secondary battery according to claim 1, wherein particles of the positive electrode active material contained in the positive electrode plate are physically and electrically interconnected.

7. The secondary battery according to claim 1, wherein the positive electrode plate has a porosity of 2 to 20%.

8. The secondary battery according to claim 1, wherein the positive electrode plate has an average pore aspect ratio of 1.2 or more.

9. The secondary battery according to claim 1, wherein the pores contained in the positive electrode plate are oriented.

10. The secondary battery according to claim 1, wherein the negative electrode active material is an oxide containing at least Ti.

11. The secondary battery according to claim 1, wherein the negative electrode plate has a porosity of 2 to 20%.

12. The secondary battery according to claim 1, wherein particles of the negative electrode active material contained in the negative electrode plate are physically and electrically interconnected.

13. The secondary battery according to claim 1, wherein the negative electrode plate is a sintered plate.

14. The secondary battery according to claim 1, wherein a thickness Te of the inorganic solid electrolyte layer, a thickness Tc of the positive electrode plate, and a thickness Ta of the negative electrode plate satisfy a relation represented by $Te/(Tc+Ta)<0.25$.

* * * * *